(12) United States Patent
Zigante et al.

(10) Patent No.: US 10,144,165 B2
(45) Date of Patent: *Dec. 4, 2018

(54) METHOD AND APPARATUS FOR THE INJECTION MOLDING OF PLASTIC MATERIALS

(71) Applicant: INGLASS S.p.A., San Polo di Piave (Treviso) (IT)

(72) Inventors: Andrea Zigante, San Polo di Piave (IT); Enzo De Seta, San Polo di Piave (IT)

(73) Assignee: INGLASS S.p.A., San Polo di Piave (Treviso) (IT)

( * ) Notice: Subject to any disclaimer, the term of this patent is extended or adjusted under 35 U.S.C. 154(b) by 257 days.

This patent is subject to a terminal disclaimer.

(21) Appl. No.: 15/064,736

(22) Filed: Mar. 9, 2016

(65) Prior Publication Data

US 2016/0263801 A1 Sep. 15, 2016

(30) Foreign Application Priority Data

Mar. 12, 2015 (IT) .......................... 102015000008368

(51) Int. Cl.
 *B29C 45/57* (2006.01)
 *B29C 45/00* (2006.01)
 (Continued)

(52) U.S. Cl.
 CPC .......... *B29C 45/57* (2013.01); *B29C 45/0025* (2013.01); *B29C 45/13* (2013.01);
 (Continued)

(58) Field of Classification Search
 CPC .. B29C 2045/0032; B29C 2945/76648; B29C 2945/76862; B29C 45/13; B29C 45/57
 See application file for complete search history.

(56) References Cited

U.S. PATENT DOCUMENTS 8,641,943 B1* 2/2014 Kipe ...................... B29C 45/77
 264/328.8
9,919,462 B2* 3/2018 Bazzo ................. B29C 45/0025
 (Continued)

OTHER PUBLICATIONS

"Flexflow", Oct. 15, 2013, XP054975575, Retrieved from the Internet: URL:http://www.youtube.com/watch?v=G2-cv79Hpeg [retrieved on Oct. 27, 2014].
(Continued)

*Primary Examiner* — Jill L Heitbrink
(74) *Attorney, Agent, or Firm* — RMCK Law Group PLC

(57) ABSTRACT

A molding method for the production of articles molded by injecting plastic material into a mold cavity by a plurality of injectors electrically sequentially actuated under an electronic control according to a cycle providing for a step for filling the mold cavity, followed by a step for packing the plastic material in the mold cavity. Each injector, regardless of both its position with respect to the mold cavity and its opening speed, is controlled in at least one of the following control modes: i) partially closing the injector from a maximum open condition to a less opened condition in the filling step, ii) setting the injector in a partially open condition and then opening the injector to a more opened condition, in the packing step.

6 Claims, 5 Drawing Sheets

(51) Int. Cl.
*B29C 45/13* (2006.01)
*B29C 45/76* (2006.01)
*B29C 45/77* (2006.01)

(52) U.S. Cl.
CPC .......... *B29C 45/7613* (2013.01); *B29C 45/77* (2013.01); *B29C 2045/0032* (2013.01); *B29C 2945/76568* (2013.01); *B29C 2945/76648* (2013.01); *B29C 2945/76658* (2013.01); *B29C 2945/76755* (2013.01); *B29C 2945/76859* (2013.01); *B29C 2945/76862* (2013.01)

(56) References Cited

U.S. PATENT DOCUMENTS

2015/0266216 A1*  9/2015  Bazzo ................ B29C 45/0046
                                                        264/328.12
2016/0167264 A1*  6/2016  Bazzo ................ B29C 45/0025
                                                        264/328.8

OTHER PUBLICATIONS

Hrsflow News: "The new FLEXflow: News HRSflow", Jul. 1, 2013, XP055205196, Retrieved from the Internet: URL: http://www.hrsflow.com/eng/news/news/the-new-flexflow.php [retrieved on Jul. 29, 2015], Publication date Oct. 9, 2014.

Italian Search Report for Italian Application No. IT UB20150245 dated Jul. 29, 2015, 7 pages.

"The new FLEXflow Accurate, stable and easy-to-use Servo-Driven valve gate for top quality. What You Have Always Dreamed of Only Better", Oct. 9, 2014 (Oct. 9, 2014), XP055205110, www.hrsflow.com Retreieved from the Internet: URL:http://www.hrsflow.com/DownLoadFileUrl.php?url=backend©©download©©file_upload©©allegato©©141009112811_1_flexflow_flyer_eng.pdf &nomefile=1_flexflow_flyer_eng.pdf [retrieved on Jul. 28, 2015] pp. 2-5.

Hrsflow News: "The new FLEXflow: News HRSflow", Jul. 1, 2013, XP055205196, Retrieved from the Internet: URL: http://www.hrsflow.com/eng/news/news/the-new-flexflow.php [retrieved on Jul. 29, 2015].

* cited by examiner

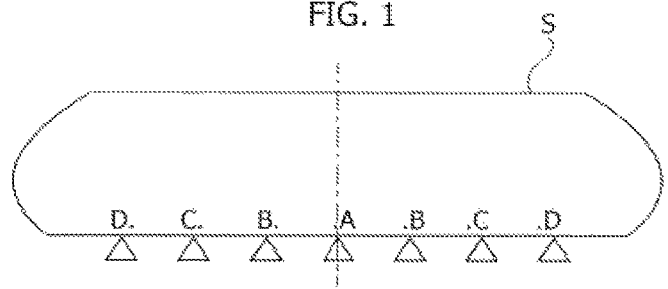
FIG. 1
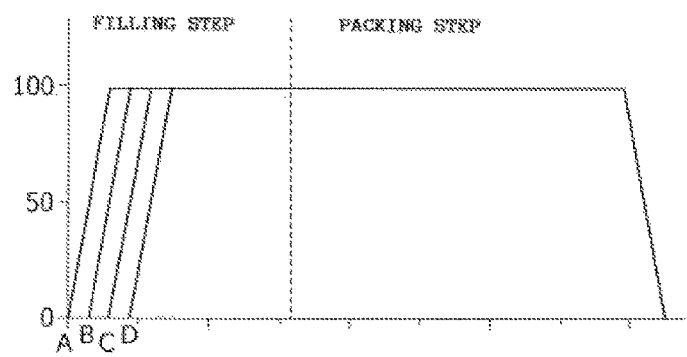
PRIOR ART  FIG. 2
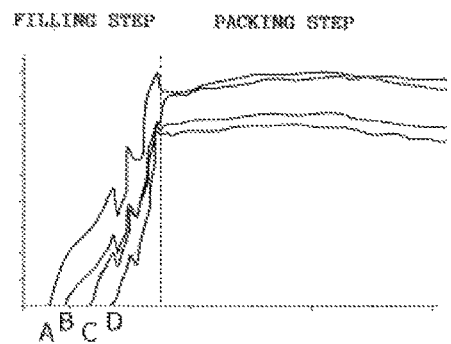
FIG. 3

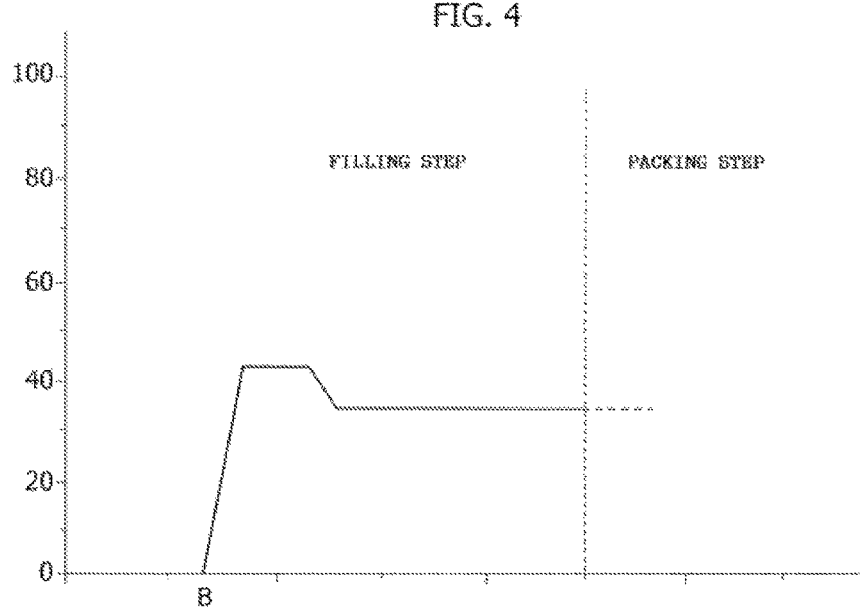
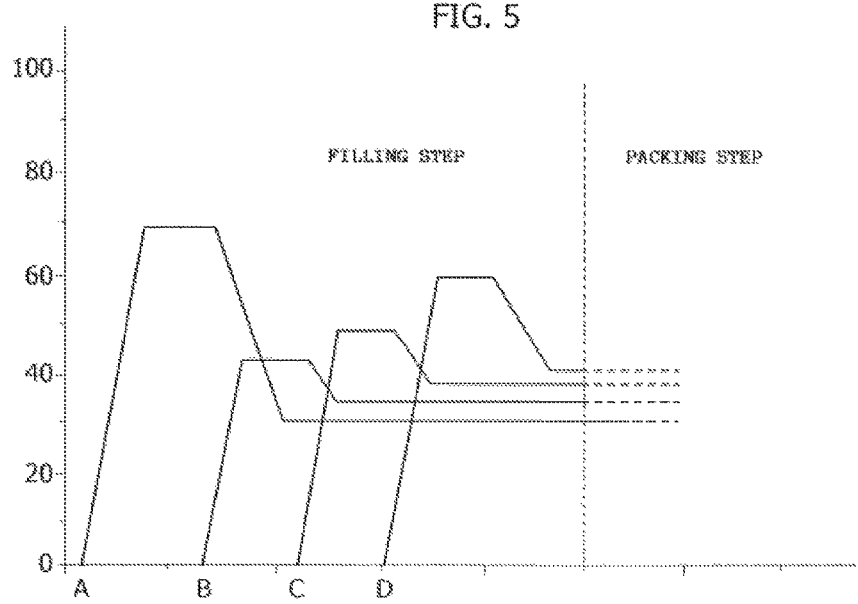

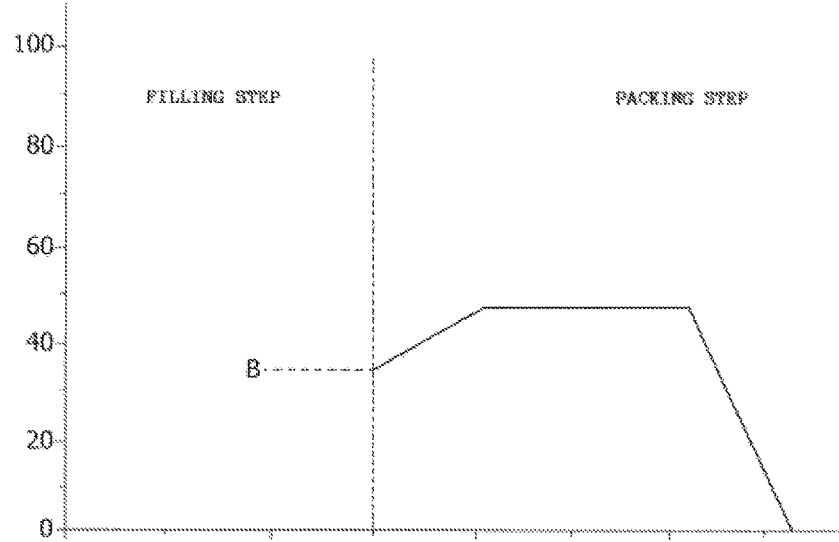
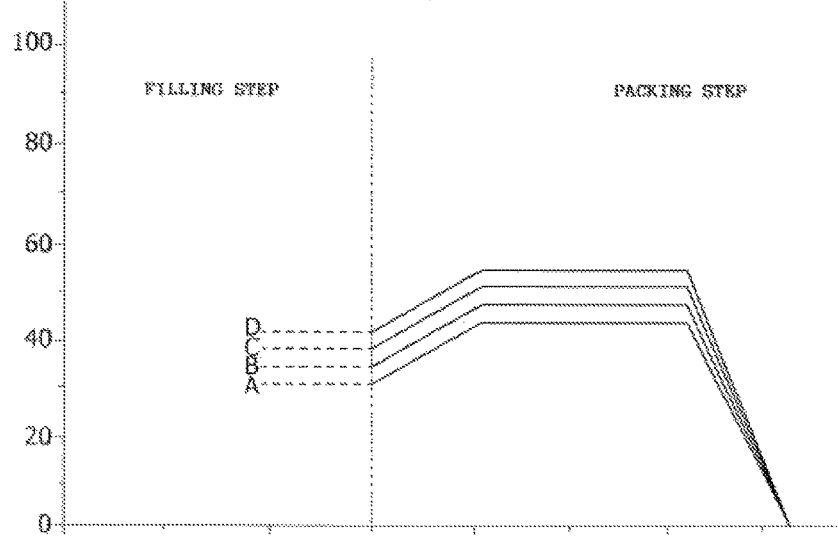

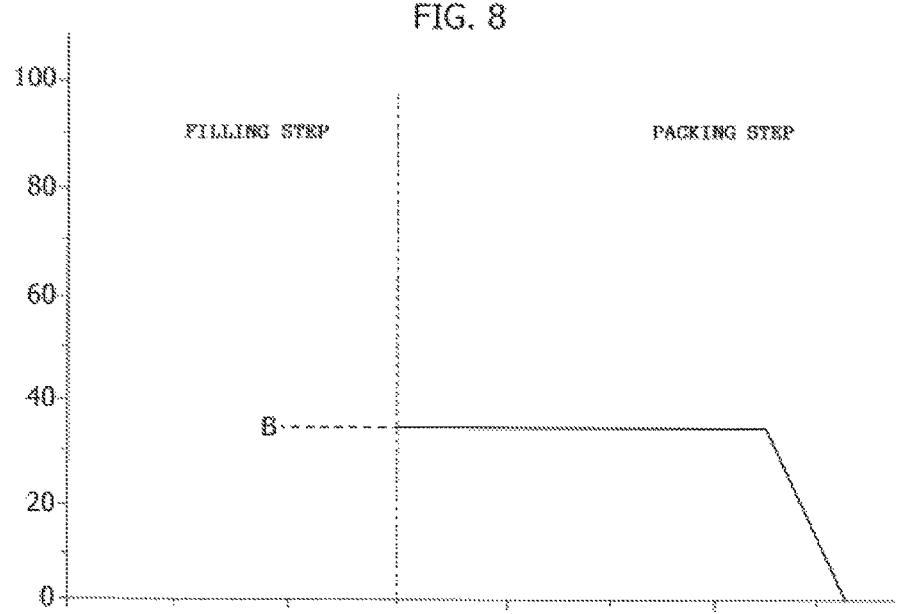
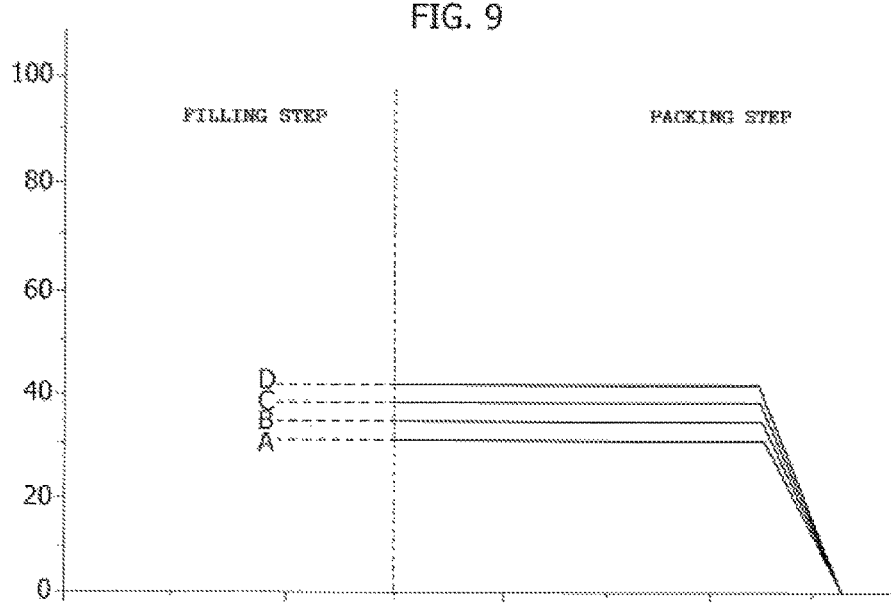

METHOD AND APPARATUS FOR THE INJECTION MOLDING OF PLASTIC MATERIALS

CROSS REFERENCE TO RELATED APPLICATIONS

This application claims priority to Italian Patent Application No. 102015000008368 filed on Mar. 12, 2015, the entire disclosure of which is incorporated herein by reference.

FIELD OF THE INVENTION

The present invention generally refers to the production of articles made of injection molded plastic material, and more particularly regards a sequential injection molding apparatus.

Such molding apparatus typically comprises a mold having a cavity, a plurality of injectors respectively arranged in central, intermediate and end positions with respect to the cavity of the mold and whose actuation is operated according to a sequential cycle mode. The injectors, of the valve type, are formed by a nozzle connected to a molten plastic material dispenser and in which a pin valve which controls the introduction of the plastic material from the dispenser to the mold cavity can be moved axially.

The displacements for opening and closing the pin valve, i.e. the opening and closing of each injector, are operated through a fluid actuator or, according to the current trend, a respective electrical actuator controlled through a control electronic unit which allows varying the position and possibly also the displacement speed of the pin valve with maximum accuracy. The electrical actuator may also be conveniently constituted by a rotary electric motor as described and illustrated for example by documents JP-06114887, U.S. Pat. No. 7,121,820 and EP-2679374 on behalf of the applicant.

STATE OF THE PRIOR ART

FIG. 1 of the attached drawings schematically represents an article that can be obtained by means of a sequential injection molding, for example constituted by a considerably large body such as for example a spoiler S for motor vehicles. The shape of the spoiler S obviously corresponds to the mold cavity, and the injectors used for the sequential injection are respectively indicated with A, the central injector, with B-C the intermediate injectors and with D the end injectors arranged in proximity of the ends of the mold cavity.

FIG. 2 is a diagram showing an example of the conventional sequential injection process method for obtaining the article S: the charts show, as a function of time, the position assumed by the pin valves of the injectors A, B, C and D expressed as a percentage, from the closure position "0" to the maximum opening position "100". As observable, the injectors are opened in a cascade fashion starting from the central injector A, for example at the same speed or even at different speed, of the relative pin valves up to complete opening (100%) during the cavity filling step. Upon reaching complete opening, all injectors are held in such position up to the end of the step for packing the plastic material in the mold cavity, before being simultaneously returned to the closing position.

The electronic control of the electrical actuators of the various injectors is difficult to correlate with the actual process conditions, i.e. a series of parameters variable as a function of variation of the operating conditions, the physical state of the plastic material and injection pressure.

The injection pressure is maximum in the moments preceding the opening of each injector and a displacement of the relative valve up to a considerable opening height (complete opening in the case of FIG. 2) may cause surface defects on the molded piece in proximity of the mold gate due to the sudden release of high pressure. Thus, this may lead to generating pressure or flow lines visible on the surface of the piece and potentially critical to the acceptability thereof especially in cases where high aesthetic standards are required.

At the same time, providing correct operating pressure, in particular generally balancing the pressure in the mold cavity to optimise the filling and solidification of the piece, is required during the packing step. Keeping the injector valves in the complete opening position does not allow controlling the aforementioned pressures, unless to the detriment of accuracy and only through the injection screw of the molding apparatus.

FIG. 3 of the attached drawings shows the pressure trends measured in the mold cavity at the gates of the injectors A, B, C, D. It is clear that non-homogeneous values and considerable pressure variations occur in the filling step whereas considerable differences between the measured pressure values are observed in the subsequent packing step in which all injectors are kept in complete opening condition as mentioned. This implies that the filling of the cavity and the subsequent solidification of the molded article shall not be optimal.

SUMMARY OF THE INVENTION

The invention has the object of overcoming the aforementioned drawbacks by optimising the filling or packing step or both the filling and packing steps, by efficiently controlling the pressure in the mold cavity so as drastically limit or even eliminate the aforementioned surface defects of the molded articles.

With the aim of attaining this object, the invention regards, according to a first aspect, a molding method of the type defined in the pre-characterising part of claim 1 and characterised in that the injector (considered as a generic injector of the group of injectors used in the sequential injection molding) is controlled, regardless of both its position with respect to the mold cavity and its opening speed, in at least one of the following modes:

partially closing the injector from a maximum open condition to a less opened condition in the filling step;

setting the injector in a partially open condition and then opening the injector to a more opened condition, in the packing step.

According to a particularly advantageous characteristic, in cases where the moulding method provides for controlling the injector in both of the aforementioned modes, the less open condition in the filling step corresponds to the partial opening condition in the packing step.

The invention also regards an apparatus for implementing the method.

BRIEF DESCRIPTION OF THE DRAWINGS

In the attached drawings:

FIG. 1 schematically illustrates an article molded by means of sequential injection and the relative arrangement of the injectors, FIG. 2 is a diagram representing the sequential injection method according to the previously described prior art, FIG. 3 is a diagram representing the development of pressure in the mold cavity corresponding to the sequential injection according to the prior art of FIG. 2, FIG. 4 is a diagram analogous to FIG. 2 showing the method for controlling a general injector according to the invention, during the filling step, FIG. 5 is a diagram analogous to FIG. 4 showing the first control method with respect to all injectors involved in the sequential injection, during the filling step, FIG. 6 is a diagram analogous to FIG. 5 showing the second method for controlling a general injector according to the invention, during the packing step, FIG. 7 is a diagram analogous to FIG. 6 showing the second control method applied to all injectors involved in the sequential injection, during the packing step, FIG. 8 shows a variant of FIG. 6, FIG. 9 shows a variant of FIG. 7.

DETAILED DESCRIPTION OF THE INVENTION

Figure 10:
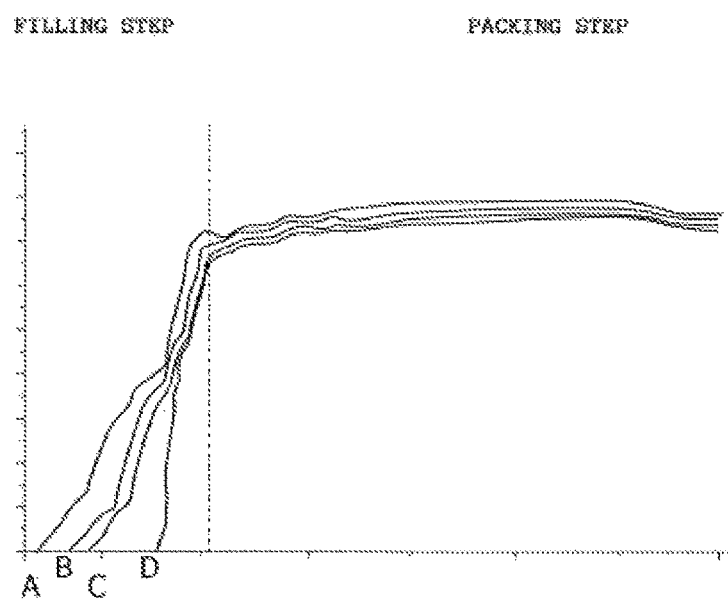
FIG. 10 is a diagram analogous to that of figure corresponding to the method according to the invention.

FIGS. 1, 2 and 3 were already described in the introduction, with reference to the sequential injection cycle implemented according to the prior art and the relative drawbacks in particular exemplified in the diagram of FIG. 3.

The chart of FIG. 4 represents the method for controlling any of the injectors A, B, C, D during sequential injection, in the filling step using the method according to the invention. It should be observed that, as explained previously, the injector is provided with a respective pin valve which can be moved axially between a complete closing position and a complete opening position by means of a respective electrical actuator, conveniently by means of a rotary electric motor for example of the type described and illustrated in the previously mentioned EP-2679374. The electric motor is in turn actuated by means of an electronic control unit configured to operate according to the principles of the invention.

The chart of FIG. 4 represents, as a function of time, the position of the pin valve of any injector, regardless of its position with respect to the mold and regardless of the displacement speed of the pin valve: for example one of the intermediate injectors B. The position of the relative pin valve is indicated as a percentage of the complete opening position, from 0 to 100%.

As observable in the diagram, the valve of the injector B is opened from the complete closure position to a maximum opening position, not necessarily coinciding with maximum opening that can only be attained at the top dead centre of the valve stroke. Such maximum opening position can for example be, in the case of the illustrated example, around 50% of the total opening, and the opening speed may be any, i.e. it does not require to be more or less quick, as mentioned.

Thus, according to a peculiar characteristic of invention, the maximum opening position is maintained for a given period of time before the valve of the injector is closed again (for example during the filling step) up to a less open position, in the order of 40% in this case for example). Thus, it has been proven through experimental tests that the pressure in the mold cavity is optimised so as to minimise or even entirely eliminate the pressure lines visible on the surface of the molded piece at the gate, during the filling step. In particular, in sequential molding this method for controlling the injectors is particularly useful to avoid the presence of adjacent sources of high pressure that could cause, even more so, a concentration of pressure lines visible on the molded article.

FIG. 5 illustrates a control method in the filling step according to the invention, applied to the sequential molding of the component exemplified in FIG. 1: the valves of the various injectors A, B, C, D are controlled electronically for example so as to set the partial closure of either each preceding injector (for example the intermediate injectors B) to the less open condition when opening or each subsequent injector (for example the injectors C) at the maximum opening condition, so as to avoid two high pressure adjacent injection points. The opening values indicated in FIG. 5 are provided purely by way of example.

The diagram of FIG. 6 represents the second peculiar method for controlling a generic injector, for example still one of the intermediate injectors B, during the packing step. As mentioned previously, the diagram represents the position of the injector pin valve, indicated as a percentage of the complete opening position from 0 to 100%, as a function of time.

At the end of the filling step, the injector valve is in an opening position, for example the one mentioned previously with reference to the filling step: from this position, according to a further peculiar aspect of the invention, the injector is further opened up to a greater opening height, normally always partial and for example lesser than the maximum opening attained in the filling step. In this manner, the injection pressure at the injector may be further efficiently controlled, by generally balancing the pressure in the mold cavity so as to optimise the formation and solidification of the article. Even during this step, neither the position of the injector with respect to the mold cavity nor the opening speed of the relative pin valve constitute considerable or critical parameters, in the sense that the opening position and speed may be any.

This condition of greater opening of the injector is maintained during the entire packing step, at the end of which the injector is brought to the complete closure position, at any speed even in this case.

FIG. 7 shows the packing step regarding all injectors A, B, C, D illustrated in FIG. 1 during sequential molding. as observable, the degree of greater opening may be maximum for the end injectors D and progressively lesser for the intermediate injectors C and B up to the central injector A.

It should be observed that the first control method described previously regarding the filling step and according to the control method described herein regarding the packing step can be implemented independently with respect to each other, in the sense that only one or the other can be carried out according to the invention. However, the invention also provides for the alternative of implementing both: in this case, the aforementioned lesser opening condition in the filling step may conveniently correspond to the partial opening condition at the beginning of the packing step, then followed by the aforementioned greater opening condition.

Alternatively, at the end of the filling step, should the condition of lesser opening of the general injector precisely correspond to the optimal partial opening condition to be maintained during the packing step, such condition shall be obviously maintained during the entire packing step up to complete closure. This situation is represented in FIG. 8 with reference to a general injector, for example—once again, one of the intermediate injectors B, and in FIG. 9 with reference to all injectors A, B, C, D.

The chart of FIG. 10 illustrates the pressure trends detected, by experiment, in the mold cavity in the case of the sequential injection carried out by means of the injectors A, B, C and D with the first control method during the filling step according to the invention and with the second control method during the packing step according to the invention. It is clear that pressure is more homogeneous and uniform with respect to the prior art (FIG. 3), thus optimising the formation and solidification of the molded article hence attaining considerably improved surface aesthetic quality.

A further aspect of the invention provides for that the general injector opening and closure cycle, through which the process parameters can be controlled, is automatically set in the relative electronic control unit based on the analysis results observed on the finished elements.

The molding apparatus for implementing the method shall be generally conventional and only the configuration of the electronic units of the electrical actuators of the injectors shall be set so as to attain one, the other, or both control methods described above.

Obviously, the details of the invention may widely vary with respect to what has been described and illustrated, without departing from the scope of protection defined by the claims that follow.

The invention claimed is:

1. A molding method for the production of articles molded by injecting plastic material into a mold cavity by a plurality of injectors electrically sequentially actuated under an electronic control according to a cycle providing for each of the plurality of injectors a step of filling the mold cavity with the plastic material, in which the injector is opened from a fully closed condition to a maximum open condition, followed by a step of packing the plastic material in the mold cavity in which the injector is maintained in an open condition and then again closed to the fully closed condition, wherein the injector, regardless of both its position with respect to the mold cavity and its opening speed, is controlled in at least one of the following control modes:

partially closing the injector from said maximum open condition to a less opened condition in the filling step, setting the injector in a partially open condition and then opening the injector to a more opened condition, in the packing step.

2. The method according to claim 1, wherein the injector is controlled in both of said modes.

3. The method according to claim 2, wherein said less opened condition of the injector in the filling step corresponds to said partially open condition in the packing step.

4. The method according to claim 1, wherein during the sequential injection performed by said plurality of injectors the control mode in the filling step provides the partial closing to said less opened condition of each injector when a subsequent injector is being opened towards said maximum open condition.

5. A molding apparatus for the production of articles molded through sequential injection of plastic material, comprising a mold having a cavity, a plurality of injectors electrically actuated by an electronic controller configured to carry out for each injector a step for filling the mold cavity with the plastic material, in which the injector is opened from a fully closed condition to a maximum open condition, followed by a step for packing the plastic material in the mold cavity in which the injector is maintained in an open condition and then again closed to the fully closed condition, wherein said electronic controller is configured so that the injector, regardless of both its position with respect to the mold cavity and its opening speed, is controlled in at least one of the following control modes:

partially closing the injector from said maximum open condition to a less opened condition in the filling step, setting the injector in a partially open condition and then opening the injector to a more opened condition, in the packing step.

6. The apparatus according to claim 5, wherein each injector includes a pin valve axially displaceable by a respective electrical actuator.

\* \* \* \* \*